US011476961B2

(12) United States Patent
Kaleko et al.

(10) Patent No.: US 11,476,961 B2
(45) Date of Patent: Oct. 18, 2022

(54) DEVICE, SYSTEM AND METHOD FOR REBROADCASTING COMMUNICATION DATA WITH ADDITIONAL CONTEXT DATA

(71) Applicant: MOTOROLA SOLUTIONS, INC., Chicago, IL (US)

(72) Inventors: David Kaleko, Chicago, IL (US); Alexander Saputa, Chicago, IL (US); Juan Felipe Gonzalez-Gomez, Chicago, IL (US); Luke Young, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 220 days.

(21) Appl. No.: 17/080,429

(22) Filed: Oct. 26, 2020

(65) Prior Publication Data

US 2022/0131628 A1   Apr. 28, 2022

(51) Int. Cl.
  *H04H 20/02* (2008.01)
  *G10L 13/00* (2006.01)
  *G10L 15/02* (2006.01)
  *H04H 20/33* (2008.01)

(52) U.S. Cl.
  CPC .............. *H04H 20/02* (2013.01); *G10L 13/00* (2013.01); *G10L 15/02* (2013.01); *H04H 20/33* (2013.01)

(58) Field of Classification Search
  CPC ........ H04H 20/02; H04H 20/33; G10L 13/00; G10L 15/02; H04W 4/90; H04W 76/40; H04W 76/50; H04W 4/06
  See application file for complete search history.

(56) References Cited

U.S. PATENT DOCUMENTS

| 8,841,990 B2 | 9/2014 | Bell |
| 9,344,532 B2 | 5/2016 | Corretjer et al. |
| 9,514,632 B2 | 12/2016 | Hunter |

(Continued)

FOREIGN PATENT DOCUMENTS

| DE | 2829296 A1 | 1/1980 |
| EP | 2426865 A2 | 3/2012 |

(Continued)

OTHER PUBLICATIONS

PCT/US2021/055729, Device, System and Method for Rebroadcasting Communication Data With Additional Context Data, Oct. 20, 2021.

*Primary Examiner* — Shaima Q Aminzay
(74) *Attorney, Agent, or Firm* — Perry + Currier, Inc.

(57) ABSTRACT

A device, system and method for rebroadcasting communication data with additional context data is provided. A device detects communication data broadcast on a first radio channel by a radio device associated with a first user. In response to determining that the communication data meets given criteria for rebroadcasting, the device: determines additional context data associated with one or more of the radio device and the first user; identifies one or more second radio channels for rebroadcast of the communication data; and causes at least a portion of the communication data and the additional context data to be broadcast on the one or more second radio channels, the additional context data being broadcast in a channel-compatible format one or more of preceding, succeeding and embedded in the portion of the communication data.

20 Claims, 6 Drawing Sheets

(56) References Cited

U.S. PATENT DOCUMENTS

| | | | |
|---|---|---|---|
| 2010/0002845 A1* | 1/2010 | Zerillo | H04M 3/5116 379/37 |
| 2012/0174191 A1* | 7/2012 | Wood | G06F 21/6218 726/4 |
| 2015/0072716 A1 | 3/2015 | Klein | |
| 2019/0239186 A1 | 8/2019 | Tugnawat et al. | |
| 2020/0329348 A1 | 10/2020 | Halun et al. | |

FOREIGN PATENT DOCUMENTS

| | | |
|---|---|---|
| JP | 4005742 B2 | 11/2007 |
| JP | 5406811 B2 | 2/2014 |

\* cited by examiner

DEVICE, SYSTEM AND METHOD FOR REBROADCASTING COMMUNICATION DATA WITH ADDITIONAL CONTEXT DATA

BACKGROUND OF THE INVENTION

Public service personnel, such as police, firefighters, and the like, may transmit emergency radio messages (e.g., "MAYDAY" calls), and the like, on a radio channel, using a radio device, regardless whether or not other radio devices are tuned to the radio channel, such that the emergency radio message may not be received. Furthermore, a simple "MAYDAY" call may not lead to an adequate response.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public service personnel, such as police, firefighters, and the like, may transmit emergency radio messages (e.g., "MAYDAY" calls), and the like (e.g., calls for help, suspect spotted calls, suspect has a weapon calls, etc.), on a radio channel, using a radio device, regardless whether or not other radio devices are tuned to the radio channel, such that the emergency radio message may not be received. Furthermore, a simple "MAYDAY" call may not lead to an adequate response. For example, a police officer, and the like, may be using a radio device to communicate via a first radio channel. When the police officer is in trouble (e.g., hurt and the like), the police officer may broadcast "MAYDAY", and the like over the first radio channel; however, such a broadcast is only effective when other radio devices of other police officers and/or other public safety personnel are also tuned to the first radio channel. In particular when no other radio devices are tuned to the first radio channel, the police officer may receive no response and/or no assistance. Furthermore, even when received, a "MAYDAY" may not provide sufficient information for an adequate response.

Hence, provided herein is a device, system and method for rebroadcasting communication data with additional context data. For example, a radio-channel monitoring device, which monitors and/or detects communications on radio channels, may detect and/or monitor communication data (e.g., audio data and/or video data) on a first radio channel, broadcast by a radio device associated with a first user, that meets given criteria for rebroadcasting, such as a communication data including given words (e.g., audio the first user speaking "MAYDAY", and the like), given sounds (e.g., a gunshot, and the like), given images (e.g., an injured police officer, and the like), amongst other possibilities. Responsive to the communication data meeting the given criteria for rebroadcasting, the radio-channel monitoring device identifies one or more second radio channels for rebroadcast of the communication data, and causes the communication data to be rebroadcast on the one or more second radio channels with additional context data associated with the radio device and/or the first user.

The communication data and the additional context data is rebroadcast in a format compatible with the one or more second radio channels; for example, when the communication data of the first radio channel comprises video data, and the one or more second radio channels do not support video data, but supports audio data, audio data from the communication data is rebroadcast on the one or more second radio channels. Hence, the communication data that is rebroadcast may include a portion of the original communication data.

The additional context data that is broadcast on the one or more second radio channels, with the rebroadcast of the communication data, may include a location and/or name and/or description and/or a medical condition, and the like, of the first user, amongst other possibilities. For example, when the communication data from the first radio channel indicates that the first user is injured, the additional context data may indicate that the first user is injured. Hence, the additional context data may be determined from the communication data. However, the communication data may also be retrieved from electronic employee records, and the like; for example, when the first user has a given blood type and/or medical condition, the additional context data may include the given blood type and/or medical condition so that any medical personnel receiving the rebroadcast via the one or more second radio channels may respond with appropriate blood supplies and/or medical devices to provide medical assistance.

An aspect of the present specification provides a method comprising: detecting, by a radio-channel monitoring device, communication data broadcast on a first radio channel by a radio device associated with a first user; and in response to determining, by the radio-channel monitoring device, that the communication data meets given criteria for rebroadcasting: determining, by the radio-channel monitoring device, additional context data associated with one or more of the radio device and the first user; identifying, by the radio-channel monitoring device, one or more second radio channels for rebroadcast of the communication data; and causing, by the radio-channel monitoring device, at least a portion of the communication data and the additional context data to be broadcast on the one or more second radio channels, the additional context data being broadcast in a channel-compatible format one or more of preceding, succeeding and embedded in the portion of the communication data.

Another aspect of the present specification provides a device comprising: a communication unit; and a controller communicatively coupled to the communication unit, the controller configured to: detect, via the communication unit, communication data broadcast on a first radio channel by a radio device associated with a first user; and in response to determining that the communication data meets given criteria for rebroadcasting: determine additional context data associated with one or more of the radio device and the first user; identify one or more second radio channels for rebroadcast of the communication data; and cause, via the communication unit, at least a portion of the communication data and the additional context data to be broadcast on the one or more second radio channels, the additional context data being broadcast in a channel-compatible format one or more of preceding, succeeding and embedded in the portion of the communication data.

Figure 1:
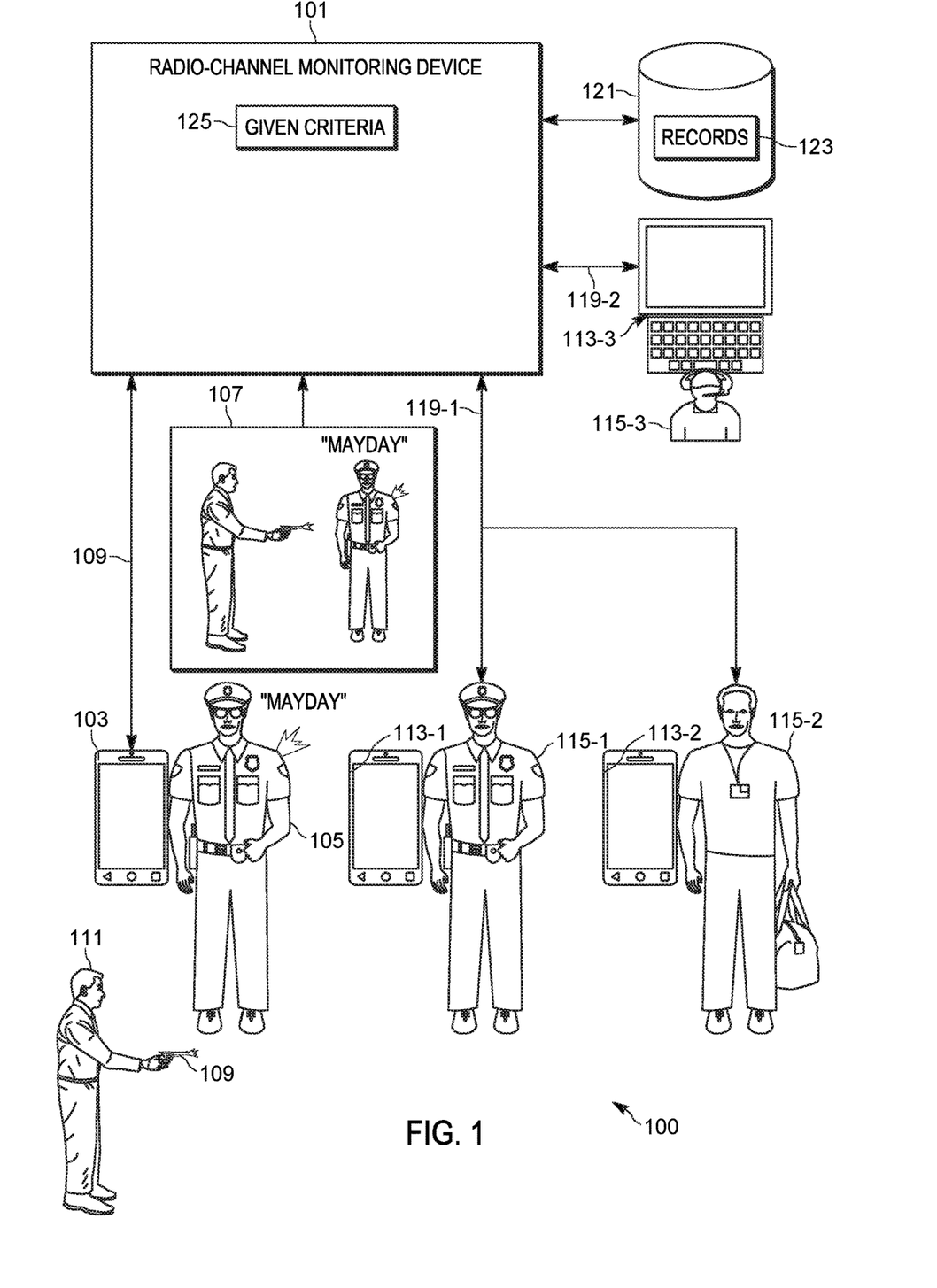
FIG. 1 is a system for rebroadcasting communication data with additional context data, in accordance with some examples.

Attention is directed to FIG. 1, which depicts an example system 100 for rebroadcasting communication data with additional context data. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

While present examples are described with respect to a radio-channel monitoring device and mobile devices associated with a public-safety entity (e.g., such as a police department, and the like), radio-channel monitoring devices and mobile devices associated with other types of entities may leverage a same or similar technique as described herein. For example, radio-channel monitoring devices and mobile devices associated with a warehousing entity, a construction entity, a service industry entity and/or any suitable entity in which employees, and the like, use radio devices that communicate over a plurality of channels, may implement a same or similar technique as described herein.

The system 100 comprises a radio-channel monitoring device 101 configured to monitor and/or detect communication data on radio channels. Hereafter, the radio-channel monitoring device 101 is interchangeably referred to as the device 101, As depicted, the system 100 further comprises a first radio device 103 operated by a first user 105, and the first radio device 103 is broadcasting communication data 107 on a first radio channel 109 (e.g., via an associated communication link). As such, the first radio device 103 is understood to be communicating on the first radio channel 109 and/or tuned to the first radio channel 109. The first radio device 103 is interchangeably referred to hereafter as the radio device 103. While as depicted no radio devices are tuned to the first radio channel 109 (e.g., the first radio device 103 is in communication with only the device 101 via the first radio channel 109), in other examples, the first radio device 103 may be in communication with other radio devices and/or other radio devices may be tuned to the first radio channel 109.

In the depicted example, the first user 105 comprises a police officer who has been shot by a suspect 111. While not depicted, the first user 105 may also have been assigned a vehicle. As such, the first user 105 is understood to be injured and has operated the first radio device 103 to broadcast "MAYDAY" on the first radio channel 109. While present examples are described with regards to a "MAYDAY" call, any suitable call, and/or communication data 107 broadcast by the first radio device 103 is within the scope of the present specification. For example, the first user 105 may operate the first radio device 103 to broadcast a call for help, a suspect spotted call, a suspect has a weapon call and/or any other suitable communication data 107.

It is furthermore understood that, in the depicted example, the first radio channel 109 supports video data and audio data (e.g., as combined with the video data). For example, as depicted, the communication data 107 includes images (e.g., video frames of video data) the suspect 111 firing a gun (e.g., represented by a flash coming from the gun in FIG. 1), and the first user 105 being injured (e.g., shot in a shoulder, as represented by a burst of lines at a shoulder of the first user 105 in FIG. 1). The communicating data 107 further includes audio (e.g., incorporated into the video frames) of the word "MAYDAY" being spoken by the first user 105, and a sound of the gun being fired. While not depicted, a vehicle of the first user 105 may also be in the images. It is further understood that the communication data 107 may include any suitable metadata including, but not limited to, a time at which the communication data 107 was generated, a location of the first radio device 103, an identifier of the first radio device 103 and/or the first user 105, and the like. However, the communication data 107 may comprise one or more of audio data and video data including, but not limited to, audio data without video data.

As there are no other radio devices communicating using the first radio channel 109, other users in the system 100 may not receive the communication data 107 and/or the "MAYDAY" broadcast by the first radio device 103 on the first radio channel 109.

However, as also depicted, the system 100 further comprises a second radio devices 113-1, 113-2, 113-3 operated by respective second users 115-1, 115-2, 115-3 and communicating via respective second radio channels 119-1, 119-2 and/or tuned to the respective second radio channels 119-1, 119-2. In particular, the second radio devices 113-1, 113-2 are communicating via, and/or tuned to, a second radio channel 119-1, and the second radio device 113-3 is tuned to a second radio channel 119-2. Hereafter, the second radio devices 113-1, 113-2, 113-3 are interchangeably referred to, collectively, as the second radio devices 113, and, generically, as a radio device 113. This convention will be used throughout the present specification. For example, the second users 115-1, 115-2, 115-3 are interchangeably referred to, collectively, as the second users 115, and, generically, as a second user 115; similarly, the second radio channels 119-1, 119-2 are interchangeably referred to, collectively, as the second radio channels 119, and, generically, as a second radio channel 119.

While three second radio devices 113, and two second radio channels 119 are depicted, the system 100 may comprise any suitable number of second radio devices 113 to any suitable number of second radio channels 119, including, but not limited to, one second radio device 113 tuned to one second radio channel 119.

Furthermore, the second radio devices 113 may be mobile or fixed, as desired. For example, as depicted, the second radio devices 113-1, 113-2 comprise mobile devices operated by public safety personnel in the field; in particular, the second user 115-1 comprises a police officer, and the second user 115-2 comprises a medical technician. However, in other examples the second users 115 may comprise other type of public-safety personnel, and the like, such as firefighters, and the like, and/or any suitable type of user.

However, as depicted, the second radio device 113-3 comprises a fixed device such as a dispatch device, operated by a dispatcher (e.g., the second user 115-3 comprises a dispatcher). For example, the second radio device 113-3 may be operated by the user 115-3 to dispatch public safety personnel to incidents. In particular, the second radio device 113-3 may have been operated by the user 115-3, to dispatch the first user 105 to an incident involving the suspect 111, such that the second radio device 113-3 communicated with first radio device 103 via the first radio channel 109. Thereafter the user 115-3 may have operated the second radio device 113-3 to switch to the second radio channel 119-2.

In particular, the radio devices 103, 113 are generally configured to communicate via channels, such as the channels 109, 119, and/or communication channels, including, but not limited to, talkgroups. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP (Voice-over-internet-protocol) communication path, a push-to-talk channel, and the like. Indeed, groups of channels may be logically organized into talkgroups, and/or dynamically allocated into talkgroups, though channels in a talkgroup may be dynamic as the traffic (e.g., communications) in a talkgroup may increase or decrease, and channels assigned to the talkgroup may be adjusted accordingly. Hence, calls and/or communications herein may include, but are not limited to, push-to-talk (PTT) calls, VOIP calls, cell phone calls, and the like, adapted for broadcast of communication data.

Furthermore the term "broadcast" and/or the term "rebroadcast", as used herein, may be understood as transmission of data on a radio channel that may be specific to the radio channel, but not specifically directed to only one particular radio device tuned to the radio channel. Put another way, communication data broadcast on a particular radio channel is understood to be received by all radio devices tuned to the particular radio channel.

Hence, for example, communication data transmitted on the channels 109, 119, including, but not limited to, the communication data 107, may include communication data transmitted via PTT calls and/or PTT broadcasts, with the radio devices 103, 113, and the device 101, adapted accordingly.

In particular, the first radio channel 109 and the one or more second radio channels 119 may comprise one or more of: land mobile radio (LMR) channels, trunked radio channels, talkgroups, and the like.

As depicted, the system 100 further comprises a memory 121, provided in the form of a database, and the like, which stores electronic records 123 (e.g., interchangeably referred to hereafter as the records 123), which may include, but are not limited to, employee and/or personnel records, incident records, vehicle assignments, radio channel records (e.g., which stores identifiers of the radio channels 109, 119 in association with identifiers of associated users 105, 115 using the radio channels 109, 119), and the like, as well as radio device assignment records (e.g., which stores identifiers of radio devices 103, 113 in association with identifiers of associated users 105, 115), vehicle assignment records (e.g., indicating vehicles assigned to the users 105, 115, such as a make, model, color, license plate number, and the like), among other possibilities. While as depicted the memory 121 is external to the device 101, in other examples, the device 101 may comprise the memory 121 and/or the records 123 may be stored at a memory of the device 101. Regardless, the device 101 has access to the records 123.

It is furthermore understood that, when mobile, the radio devices 103, 113 may be reporting their respective locations to the device 101 (e.g., as determined via respective location determining devices, such as Global Positioning System (GPS) devices, and the like) for example periodically and/or as metadata in communication data. In particular, the communication data 107 may include a location of the radio device 103 as determined by a location determining device of the radio device 103.

Hence, it is understood that the device 101 may have access to any suitable information, which enables the device 101 to determine roles and/or skills and/or identities of the users 105, 115, relationships between the users 105, 115 (e.g., a particular second user 115 may be a supervisor and/or a partner of the first user 105), locations of the radio devices 103, 113, associations between the radio devices 103, 113 and the users 105, 115, associated functions of the radio channels 109, 119, and the like. For example, the device 101 may be configured to determine that the second radio devices 113-1, 113-2 comprise mobile devices at respective locations, operated by the users 115-1, 115-2, one of which is a police officer (and who may be a supervisor of the user 105), and the other of which is a medical technician. Hence, the device 101 may also determine functionality of the second radio channel 119-1 as including use for communicating with a supervisor of the user 105 and/or medical personnel. However, in other examples, the device 101 may determine at least a portion of such information by monitoring communication data on the second radio channel 119-1 (e.g., the second user 115-2 may communicate medical information in communication data on the second radio channel 119-1). Similarly, the device 101 may be configured to determine that the second radio device 113-3 comprises a dispatch device operated by the user 115-3 who is a dispatcher. Similarly, the device 101 may be configured to determine that the first radio device 103 and/or the first user 105 is associated with a particular incident, as well as a location of the first radio device 103 and/or the first user 105.

Furthermore, via the records 123 for example, the device 101 may be configured to determine a format of the radio channels 109, 119. For example, while the first radio channel 109 may support video data, one or more of second radio channels 119 may support audio data, but not video data.

Indeed, hereafter, reference to the device 101 determining such specific information regarding the radio devices 103, 113, the users 105, 115, the radio channels 109, 119 and the like, is understood to occur via one or more of: accessing the records 123, monitoring communication data on the radio channels 109, 119, and the like.

As will be explained in further detail below, the device 101 is generally configured to monitor and/or detect the communication data 107 broadcast on the first radio channel 109 by the first radio device 103, associated with the first user 105, and in response to determining that the communication data 107 meets given criteria for rebroadcasting (e.g., as depicted given criteria 125) causes the communication data 107, and/or a portion thereof, to be rebroadcast on the one or more second radio channels 119, in respective formats compatible with the one or more second radio channels 119, with additional context data associated with the radio device 103 and/or the first user 105. The given criteria 125 will be described in more detail below.

While not depicted, the system 100 may include other types of devices. For example, in some examples, the device 101 may be configured to monitor communication data on the radio channels 109, 119, but another device of the system 100 (e.g., an associated radio device and/or radio broadcast device) may be configured to broadcast communication data on the radio channels 109, 119, for example on behalf of the device 101. Put another way, the device 101 may be configured to monitor the radio channels 109, as described herein, but may not include hardware for broadcast on the radio channels 109; in these examples, the device 101 may communicate with any suitable other devices of the system 100 to cause the communication data 107 and the additional context data to be broadcast on the one or more second radio channels 113 as described herein.

Figure 2:
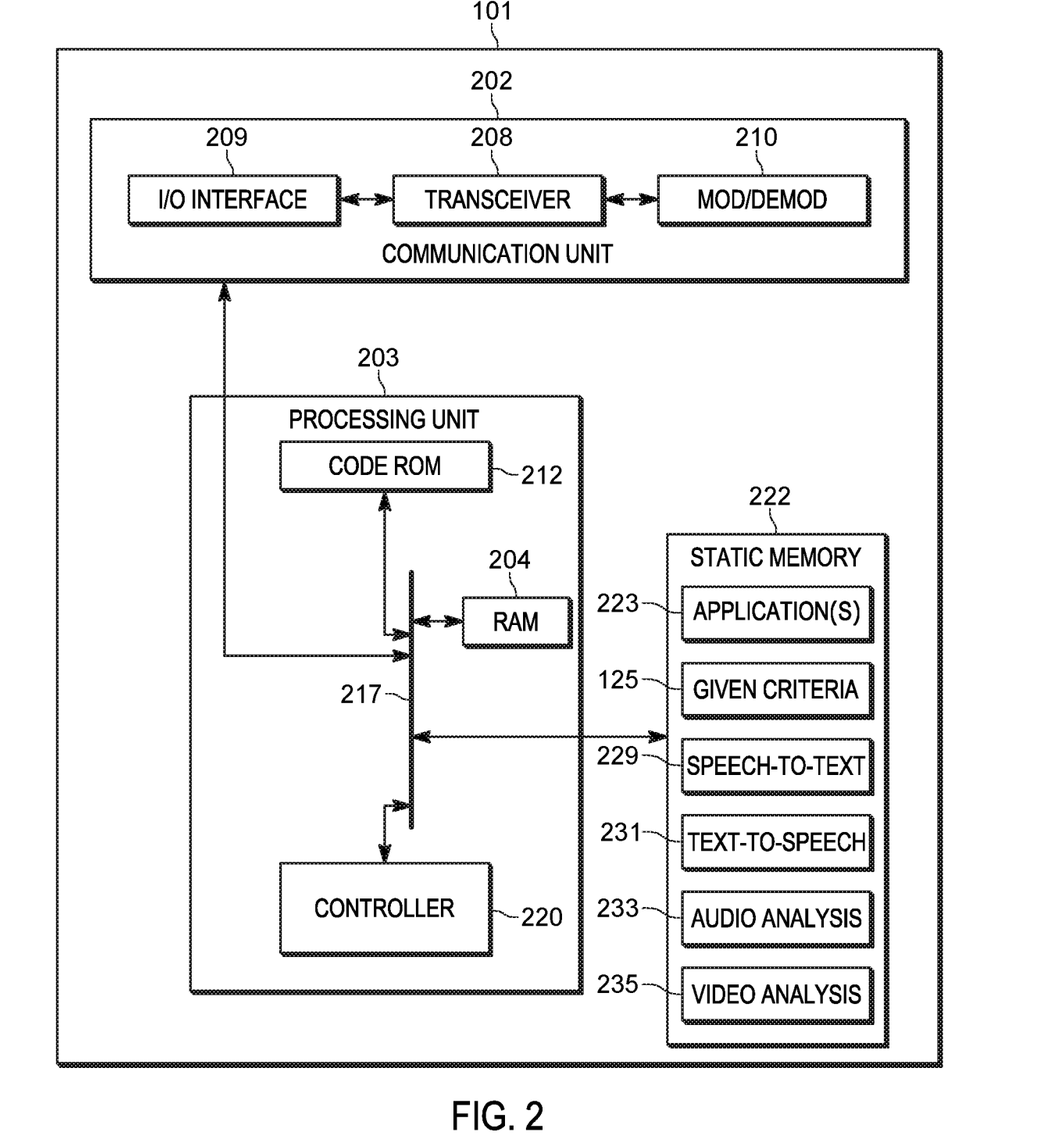
FIG. 2 is a device diagram showing a device structure of a computing device for rebroadcasting communication data with additional context data, in accordance with some examples.

Attention is next directed to FIG. 2, which depicts a schematic block diagram of an example of the device 101. In general, the device 101 may comprise one or more servers and/or one or more cloud computing devices, and the like, configured to communicate with the radio devices 103, 113, and the memory 121 and/or any other suitable component of the system 100. However, the device 101 may comprise a computing device such as a personal computer and/or a laptop computer, and the like. Indeed, in some examples, functionality of the device 101 may be combined with one or more other suitable devices of the system 100. In some examples, the device 101 may comprise a dispatch radio-channel monitoring device and/or a computer-aided dispatch (CAD) device (e.g., which may be combined with the second radio device 113-3).

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of an input device and a display screen and the like, a microphone (e.g., to receive voice commands) such that a user (e.g., an administrator of the system 100), may interact with the device 101. In some examples, the device 101 may include a clock, and the like (including, but not limited to, a clock of the controller 220 and/or the processing unit 203), which may be used to determine a time at which the communication data 107 is received and/or detected.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the radio devices 103, 113 and/or any other suitable component of the system 100, and which further enable the device 101 to monitor the first radio channel 109 (e.g., and alternatively the radio channels 119, for example simultaneously). For example, the communication unit 202 may include one or more transceivers 208 and/or wireless transceivers for communicating with the radio devices 103, 113 (e.g., to monitor the radio channels 109, 119), and/or any other suitable component of the system 100. Hence, the one or more transceivers 208 may be adapted for communication with one or more communication networks used to communicate with the radio devices 103, 113, and/or any other suitable component of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for rebroadcasting communication data with additional context data. For example, in some examples, the device 101 and/or the controller 220 specifically comprises a computer executable engine configured to implement functionality for rebroadcasting communication data with additional context data.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the device 101 as described herein are maintained, persistently, at the memory 222 and used by the controller 220, which makes appropriate utilization of volatile storage during the execution of such programming instructions.

Figure 3:
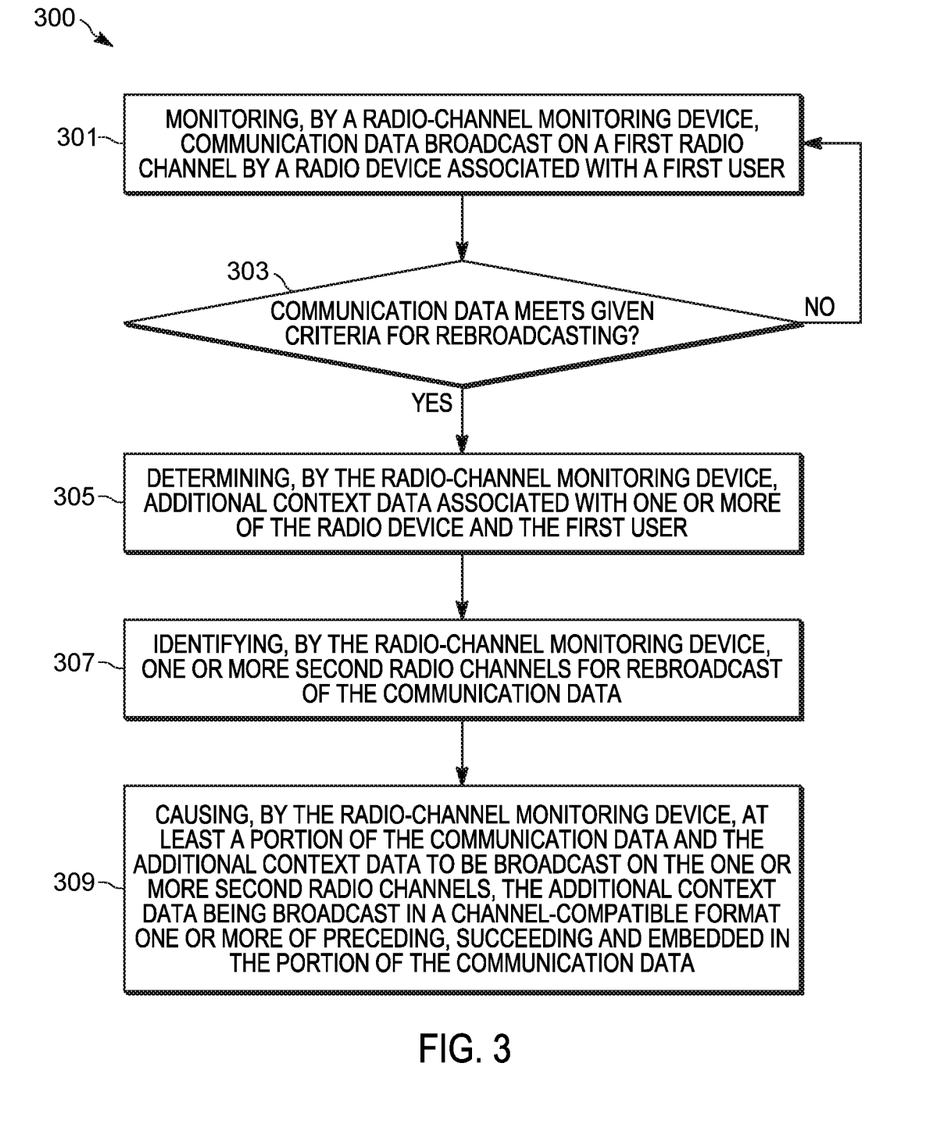
FIG. 3 is a flowchart of a method for rebroadcasting communication data with additional context data, in accordance with some examples.

In particular, the memory 222 stores instructions corresponding to the at least one application 223 that, when executed by the controller 220, enables the controller 220 to implement functionality described herein including, but not limited to, the blocks of the method set forth in FIG. 3.

As depicted, the memory 222 further stores the given criteria 125; while as depicted the given criteria 125 is stored separately from the application 223, in other examples the given criteria 125 may be stored as part of the application 223 (e.g., as a module of the application 223).

As depicted, the memory 222 further stores a speech-to-text module 229, a text-to-speech module 231, an audio analysis module 233 and a video analysis module 235, which may be used by the device 101 and/or the controller 220 while implementing the application 223. While as depicted the modules 229, 231, 233, 235 are stored separately from the application 223, in other examples the modules 229, 231, 233, 235 may be stored as part of the application 223 (e.g., as modules of the application 223).

The speech-to-text module 229 may be to implement a speech-to-text engine to convert audio data of the communication data 107 to text for analysis. Similarly, the text-to-speech module 231 may be to implement a speech-to-text engine to convert text (e.g., of additional context data from the records 123 and/or from text generated from the communication data 107) to audio data for broadcast on the one or more second radio channels 113.

The audio analysis module 233 may be to implement an audio analysis engine to analyze audio data that does not include words, and may include a spectrum analyzer and the like and/or machine learning classifiers for identifying given sounds in audio data, such as gunshots, and the like. The video analysis module 233 may be to implement a video analysis engine to analyze images of video data and may include machine learning classifiers for identifying given objects, and the like, in images, such as guns, weapons, injuries, and the like. Hence, the modules 233, 235 may be components of the given criteria 125, for example when the given criteria 125 include machine learning classifiers. Hence, hereafter, references to using the given criteria 125 to determine whether communication data meets given criteria 125 for rebroadcasting is understood to include, when appropriate, use the modules 233, 235 to identify given sounds and/or given images, and the like, in the communication data.

In illustrated examples, when the controller 220 executes the one or more applications 223, the controller 220 is enabled to: monitor communication data broadcast on a first radio channel by a radio device associated with a first user; and in response to determining, by the radio-channel monitoring device, that the communication data meets given criteria for rebroadcasting: determine additional context data associated with one or more of the radio device and the first user; identify one or more second radio channels for rebroadcast of the communication data; and cause at least a portion of the communication data and the additional context data to be broadcast on the one or more second radio channels, the additional context data being broadcast in a channel-compatible format one or more of preceding, succeeding and embedded in the portion of the communication data.

The application 223 and/or the given criteria 125 may include numerical algorithms configured to implement the functionality as described above and/or determine whether communication data meets the criteria for rebroadcasting and/or determine which additional context data to include in a rebroadcast of communication data, and/or any other suitable functionality of the device 101.

Alternatively, and/or in addition to numerical algorithms, the application 223 and/or the given criteria 125 may include machine learning models and/or algorithms, and the like, which have been trained to implement the functionality as described above and/or determine whether communication data meets the criteria for rebroadcasting and/or determine which additional context data to include in a rebroadcast of communication data, and/or any other suitable functionality of the device 101. In particular, the given criteria 125 may comprise one or more classifiers, and the like, used by one or more machine learning models and/or algorithms of the application 223 to determine whether communication data is to be rebroadcast and/or to determine which additional context data to include in a rebroadcast of communication data.

The one or more machine learning models and/or algorithms of the application 223 and and/or the given criteria 125 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. Any suitable machine learning algorithm and/or deep learning algorithm and/or neural network is within the scope of present examples.

While details of the radio devices 103, 113 are not depicted, the radio devices 103, 113 may have components similar to the device 101 adapted, however, for the functionality thereof. For example, the radio devices 103, 113 may include respective display screens, input devices, speakers, microphones, clocks (including, but not limited to, a clock of a respective controller and/or processor) and the like. Regardless, it is understood that the radio devices 103, 113 include respective transceivers for communicating via channels as described herein.

Attention is now directed to FIG. 3, which depicts a flowchart representative of a method 300 for rebroadcasting communication data with additional context data. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way that the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 301, the controller 220 and/or the device 101 monitors the communication data 107 broadcast on the first radio channel 109 by the radio device 103 associated with the first user 105. For example, the communication data 107 may be received at the controller 220 and/or the device 101 via the first radio channel 109 and analyzed by the controller 220 and/or the device 101.

At a block 303, the controller 220 and/or the device 101 determines whether that the communication data 107 meets the given criteria 125 for rebroadcasting.

For example, the communication data 107 may be compared to the given criteria 125 and/or, when the given criteria 125 (and/or the modules 233, 235) includes classifiers of a machine learning algorithm, and the like, the classifiers may be used to determine whether the communication data 107 corresponds to one or more of the classifiers.

Examples of the given criteria 125 are next described. In some examples, the given criteria 125 may be word and/or text based. In such examples, the controller 220 and/or the device 101 may implement a speech-to-text engine, using the speech-to-text module 229, to convert audio data from the communication data 107 into text for analysis.

In such text-based examples, the given criteria 125 may include determining that the communication data 107 comprises one or more given words and/or given phrases (e.g., text), such as "MAYDAY", "HELP", "SHOTS FIRED", "I'M INJURED", and the like. However, any suitable given words and/or given phrases are within the scope of the present specification.

In other examples, the given criteria 125 may be audio based (e.g., excluding words and/or phrases). In such examples, the controller 220 and/or the device 101 may implement an audio analysis engine, using the audio analysis module 233, to analyze audio data from the communication data 107.

In such audio-based examples, the given criteria 125 may include determining that the communication data 107 comprises one or more given sounds such as a gun-shot, and the like. However, any suitable given sounds are within the scope of the present specification. In a particular example, for example where the controller 220 and/or the device 101 has access to a voice sample and/or a voice pattern and/or a voice spectra of the first user 105 (e.g., which may be stored in the records 123), the given criteria 125 may include determining that the communication data 107 comprises one or more voices different from a voice of the first user 105. For example, the suspect 111 may take and/or operate the first radio device 103 to generate communication data, such as audio data falsely indicating that the first user 105 is not injured, and the controller 220 and/or the device 101 may determine that such communication data meets the given criteria 125 as the voice in the communication data is not the voice of the first user 105 (e.g., as determined from their voice sample, and the like). Alternatively, a bystander (not depicted) may take and/or operate the first radio device 103 to generate communication data, such as audio data indicating that help is needed, and the controller 220 and/or the device 101 may determine that such communication data meets the given criteria 125 as the voice in the communication data is not the voice of the first user 105 (e.g., as determined from their voice sample, and the like).

In other examples, the given criteria 125 may be image and or video based. In such examples, the controller 220 and/or the device 101 may implement a video audio analysis engine, using the video analysis module 235, to analyze images and/or video and/or video frames from the communication data 107.

In such image-based and/or video-based examples, the given criteria 125 may include determining that the communication data 107 comprises one or more images associated with emergencies including, but not limited to, images of a weapon and/or a gun and/or a gun being fired, and/or an injury, and the like. In a particular example, the given criteria 125 may include determining that the communication data 107 comprises respective images of the first user 105 in a physically injured state (e.g., with an injured shoulder as depicted in FIG. 1). However, any suitable given images are within the scope of the present specification.

Indeed, the given criteria 125 may comprise any suitable combination of the above described example criteria, and/or any other suitable criteria.

When the communication data 107 does not meet the given criteria 125 for rebroadcasting (e.g., a "NO" decision at the block 303), the controller 220 and/or the device 101 continues to monitor, at the block 301, the communication data 107 broadcast on the first radio channel 109 by the radio device 103 until the communication data 107 is determined to meet the given criteria 125 for rebroadcasting at the block 303.

Hence, in response to determining that the communication data 107 meets the given criteria 125 for rebroadcasting (e.g., a "YES" decision at the block 303), at a block 305, the controller 220 and/or the device 101, determines additional context data associated with one or more of the radio device 103 and the first user 105.

Examples of additional context data are next described. In some examples, the additional context data may include data associated with the first user 105, which may be determined from the records 123 and/or determined from the communication data 107 and/or metadata of the communication data 107 and/or times that the communication data 107 is generated and/or received at the device 101.

For example, the additional context data may include, but is not limited to, one or more of: a determined location of the radio device 103; a name of the first user 105; a description of the first user 105 (e.g., such as height, build, hair color, gender, and the like, which may be from the records 123); a medical condition of the first user 105 (e.g., such as a blood type and/or a particular medical condition, which may be from the records 123 and/or an injury, which be determined from the communication data 107); a respective description of a vehicle associated with the first user 105 (e.g., which may be determined from the records 123, for example via a vehicle assignment record associated with the first user 105 and a make and model and/or license plate number of an assigned vehicle); a time indicating when the communication data 107 was broadcast and/or received; and a type of incident to which the first user 105 is assigned (e.g., as determined from incident records).

However, as has been previously described, the device 101 may have access to locations of the second radio devices 113 and/or the second users 115, as well as a location of the first radio device 103 and/or the first user 105. While not depicted, the device 101 may have further access to locations other users (e.g., different from the second users 115) who may also be operating other radio devices and/or mobile devices, but who may, or may not, be communicating on a depicted radio channel. As has also been previously described, the device 101 may also have access to a location of the first radio device 103 and/or the first user 105.

As such, the controller 220 and/or the device 101 may be configured to determine others users, including, but not limited to the second users 115, who are closest to the first user 105, and/or names and/or descriptions of such other users (e.g., such as height, build, hair color, gender, and the like, which may be from the records 123). For example, the controller 220 and/or the device 101 may be configured to determine other users, who are closest to the first user 105 by comparing respective locations of the other users with a location of the first user 105.

In these examples, the additional context data may include, but is not limited to, one or more of: respective names of one or more other users closest to the first user 105; respective descriptions of the one or more other users closest to the first user 105; and the like. Such information may be obtained from the records 123 (and/or via analysis of video data on a radio channel, which includes images of the one or more other users).

Indeed, the additional context data may comprise any suitable combination of the above described example additional context data, and/or any other suitable additional context data. For example, the additional context data associated with one or more of the radio device 103 and the first user 105 may comprises identifiers of one or more of the radio device 103 (e.g., an inventory number, and/or other identifier, which may be inscribed on the radio device 103 and obtained from the records 123); the first user 105 (e.g., a badge number, a name and the like, as obtained from the records 123); and the first radio channel 109 (e.g., a channel number and/or talkgroup identifier of the first radio channel 109, which may be inherently known to the device 101, which is tuned to the first radio channel 109 and/or obtained from metadata of the communication data 107 and the like).

In particular, an identifier of the first radio channel 109 in the additional context data may instruct the second users 115 to tune their radio devices 113 to the first radio channel 109. For example, as will be described below, the additional context is provided to one or more of the radio devices 113 a second radio channel 119, and hence, when identifier of the first radio channel 109 is received, a second user 115 may tune their radio device 113 to the first radio channel 109 using the identifier.

At a block 307, the controller 220 and/or the device 101 identifies one or more second radio channels 113 for rebroadcast of the communication data 107.

In some examples, the controller 220 and/or the device 101 identifies all the second radio channels 113 for rebroadcast of the communication data 107. In other examples, the controller 220 and/or the device 101 identifies a subset of the second radio channels 113 for rebroadcast of the communication data 107.

Such identification of the second radio channels 119 for rebroadcast of the communication data 107 may be based on content of the communication data 107 and/or the additional context data, and/or information associated with the second radio devices 113 and/or the second users 115 (e.g., from the records 123 and/or communication data on the second radio channels 119, and the like).

For example, when content of the communication data 107 and/or the additional context data indicates that the first user 105 is injured and/or has a medical condition, and a particular second user 115 operating a second radio device 113 has medical training (e.g., such as the second user 115-2, as determined from the records 123), the controller 220 and/or the device 101 may identify the second radio channel 119 on which the particular second user 115 with medical training is operating a second radio device 113. In a particular example, with the first user 105 shot, at the block 307, the controller 220 and/or the device 101 may identify the second radio channel 119-1 for rebroadcast of the communication data 107.

Similarly, when content of the communication data 107 and/or the additional context data indicates that the first user 105 is injured and/or has a medical condition, and that no particular second user 115 operating a second radio device 113 has medical training, the controller 220 and/or the device 101 may identify the second radio channel 119-2 on which a dispatcher (e.g., the second user 115-3) is communicating so that the dispatcher may dispatch medical personnel, such as emergency medical technicians in an ambulance, to assist the first user 105.

Similarly, when content of the additional context data indicates that a second user 115-2 is closest to the first user 105, as described above, the block 307, the controller 220 and/or the device 101 may identify the second radio channel 119-1 for rebroadcast of the communication data 107.

Similarly, the controller 220 and/or the device 101 may identify one or more second radio channels 113 based on context data of one or more of the second radio device 113 and/or one or more of the second user 115 (e.g., such as location, medical experiences, roles, and the like). In another particular example, controller 220 and/or the device 101 may determine that one of the second users 115 is a partner of the first user 105 and hence the controller 220 and/or the device 101 may identify on which the second user 115 who is a partner of the first user 105 is operating a second radio device 113.

Indeed, at the block 307, the controller 220 and/or the device 101 may identify one or more second radio channels 113 by: determining content of the communication data 107; and selecting the one or more second radio channels 119 as a function of one or more of: the content of the communication data 107; and the additional context data of one or more of the radio device 103 and the first user 105 (e.g., as determined at the block 305).

It is hence understood that the controller 220 and/or the device 101 may identify second radio channels 119 on which to rebroadcast the communication data 107 using any suitable context data of any suitable combination of the radio devices 103, 113 and/or the users 105, 115, and the like. The context data may be similar to, and/or different from, any of the additional context data described herein but pertaining to one or more of the radio devices 103, 113 and/or the users 105, 115.

At a block 307, the controller 220 and/or the device 101 causes at least a portion of the communication data 107 and the additional context data to be broadcast on the one or more second radio channels 113, the additional context data being broadcast in a channel-compatible format one or more of preceding, succeeding and embedded in the portion of the communication data 107.

For example, at the block 309, the controller 220 and/or the device 101 may broadcast the communication data 107 and the additional context data on the one or more second radio channels 113 and/or controller 220 and/or the device

101 may control an associated radio device and/or radio broadcast device to broadcast the communication data 107 and the additional context data on the one or more second radio channels 113.

Regardless, the additional context data is broadcast on the identified one or more second radio channels 119 in a channel-compatible format one or more of preceding, succeeding and embedded in the portion of the communication data 107. For example, when the additional context data comprises text from the records 123, the additional context data may be converted to audio data by implementing a text-to-speech engine using the text-to-speech module 231 so that the additional context data may be broadcast as audio data on the identified one or more second radio channels 119. The audio data may be broadcast prior to the portion of the communication data 107 and/or after the portion of the communication data 107 on the identified one or more second radio channels 119.

Similarly, the communication data 107 is also generally in a channel-compatible format when rebroadcast on the one or more second radio channels 119. For example, when the communication data 107 comprises video data and the one or more second radio channels 119 supports audio data, but not video data, audio data of the communication data 107 may be extracted therefrom for rebroadcast the one or more second radio channels 119.

Alternatively, images of the communication data 107 may be converted to audio data corresponding to descriptive text (e.g., which describe object and/or people and/or situations in the images) by the controller 220 and/or the device 101 (e.g., using a video analysis engine implemented by the video analysis module 235, as well as the text to speech module 231, and the like).

Alternatively, when the identified one or more second radio channels 119 support video data, the additional context data may be converted to video data, for example as text and/or graphics embedded in video data from the communication data 107. In some of these examples, the controller 220 and/or the device 101 may use text of the additional context data to annotate video data (e.g., a name of the first user 105, text and/or graphics indicating an injury, and the like, may be placed on an image of the first user 105 in video data of the communication data 107 rebroadcast on the identified one or more second radio channels 119).

Hence, when the formats of the first radio channel 109 and the identified one or more second radio channels 119 are different (e.g., the first radio channel 109 may support video data, but the one or more second radio channels may support audio data but not video data), the method 300 may further comprise converting the additional context data and/or the communication data 107 to a channel-compatible format. In particular, when the channel-compatible format comprises an audio format, the method 300 may further comprise the controller 220 and/or the device 101 converting the additional context data/or the communication data 107 to the audio format using a text-to-speech engine (e.g., implemented using the text-to-speech module 231).

It is hence further understood that the communication data 107, rebroadcast via the controller 220 and/or the device 101, on the identified one or more second radio channels 119, may comprise the entirety of the communication data 107 received on the first radio channel 109 and/or a subset and/or a portion of the communication data 107 received on the first radio channel 109, in an original format and/or converted to another format; regardless the format of the communication data 107 and the additional context data broadcast on identified one or more second radio channels 119 is compatible with the identified one or more second radio channels 119.

It is yet further understood that, at the block 309, when the portion of the communication data 107 and the additional context data is broadcast on the identified one or more second radio channels 119, all of the radio devices 113 that are tuned to, and/or communicating on, the identified one or more second radio channels 119 receive the portion of the communication data 107 and the additional context data.

In yet further examples, at the block 307, the controller 220 and/or the device 101 may identify two or more of the second radio channels 119 for rebroadcast of the communication data 107 and the additional context data determined at the block 305 and/or broadcast on the two or more of the second radio channels 119, may vary for the two or more of the second radio channels 119.

Put another way, when the controller 220 and/or the device 101 identifies two or more of the second radio channels 119 for rebroadcast of the communication data 107 and the additional context data, the additional context data may be customized for particular the second radio channels 119.

For example, the additional context data may be varied for each of two or more of the identified second radio channels 119 based on one or more of: an associated function of each of the two or more of the second radio channels 119; one or more of associated roles and associated identities of other users 115 associated with each of the two or more of the second radio channels 119; and context data associated with the other users 115 associated with each of the two or more of the second radio channels 119.

Hence, for example, as has already been described, medical information associated with the user 105, as determined from the records 123, such as a blood type and/or a medical condition, may be broadcast as additional context data with at least a portion of the communication data 107 on the second radio channel 119-1 (e.g., as the user 115-2 may have a role and/or a function of a medical technician and hence an associated function of the second radio channel 119-1 may comprise a medical function). However, such medical information may be omitted from additional context data broadcast with a portion of the communication data 107 on the second radio channel 119-2, which has a dispatching function.

In a further example, another second radio channel 119 may have a firefighter function, or a supervisor function (e.g., as respective second users 115 of associated radio devices 113 may be firefighters or supervisors), and the additional context data may be varied accordingly. For example, while not heretofore described, additional context data for firefighters may include, but is not limited to, a floor plan (e.g., as stored in the records 123) of a building in which the first user 105 is located (e.g., when the communication data 107 indicates that the first user 105 is trapped in a building on fire). Similarly, additional context data for supervisors may include, but is not limited to, an employee record for the first user 105. Such examples further illustrate that while an incident of an injury of a police officer has been used as an example in FIG. 1, other incident types and/or other types of second users are within the scope of the present specification, with the communication data 107 and the additional context data adapted accordingly.

Figure 4:
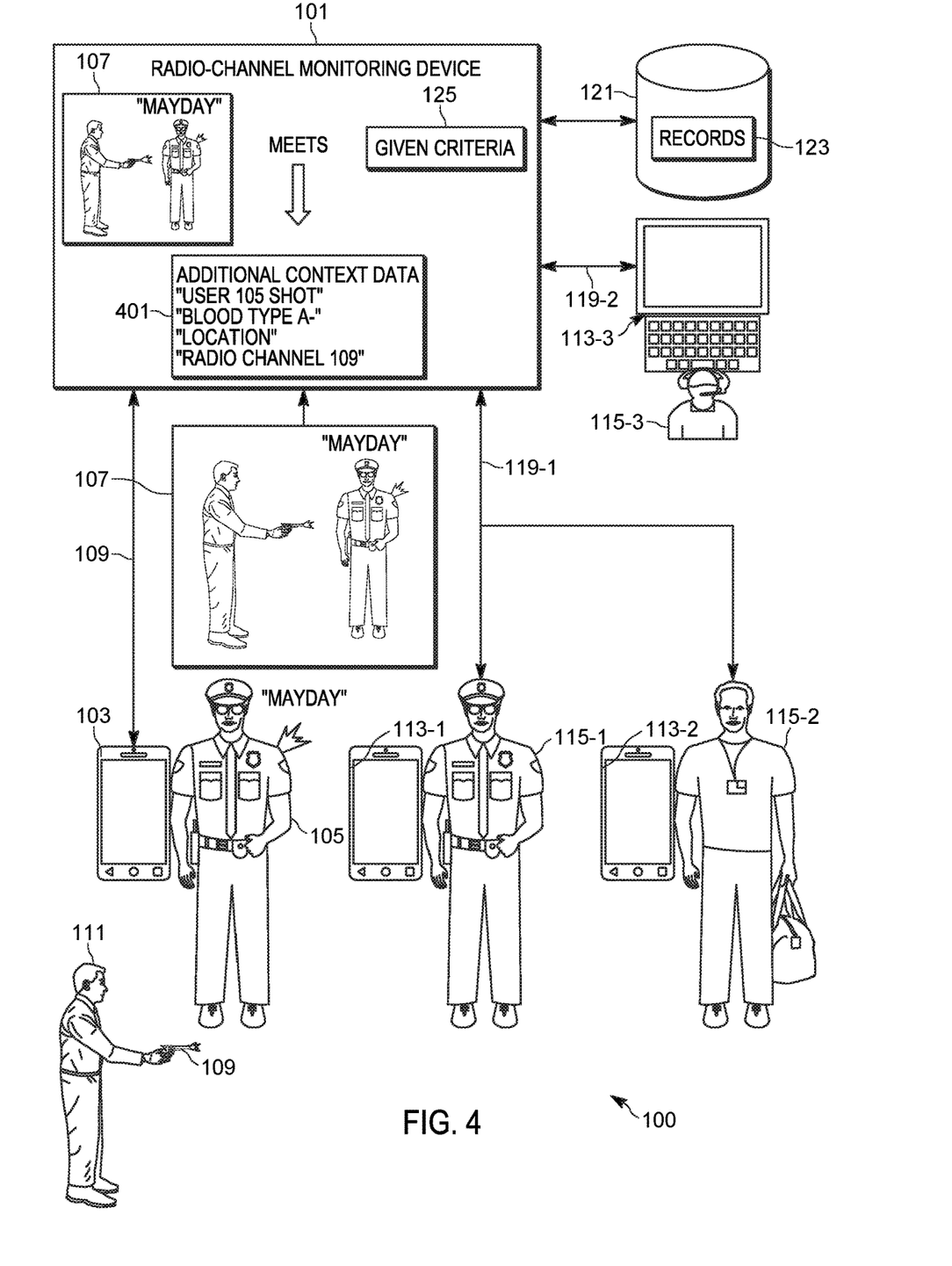
FIG. 4 depicts aspects of an example of a method for rebroadcasting communication data with additional context data implemented in the system of FIG. 1.
Figure 5:
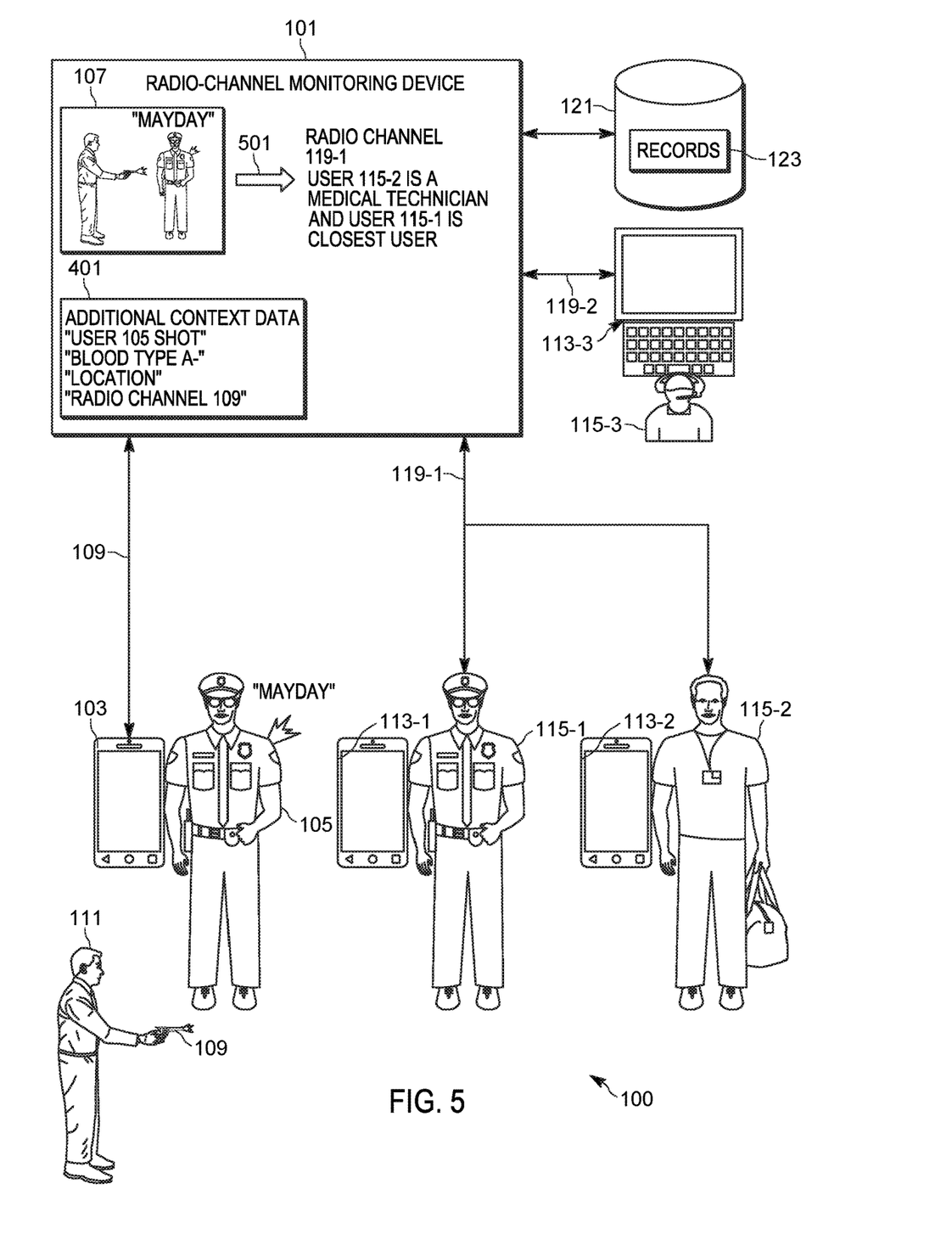
FIG. 5 depicts further aspects of the example of the method for rebroadcasting communication data with additional context data implemented in the system of FIG. 1.
Figure 6:
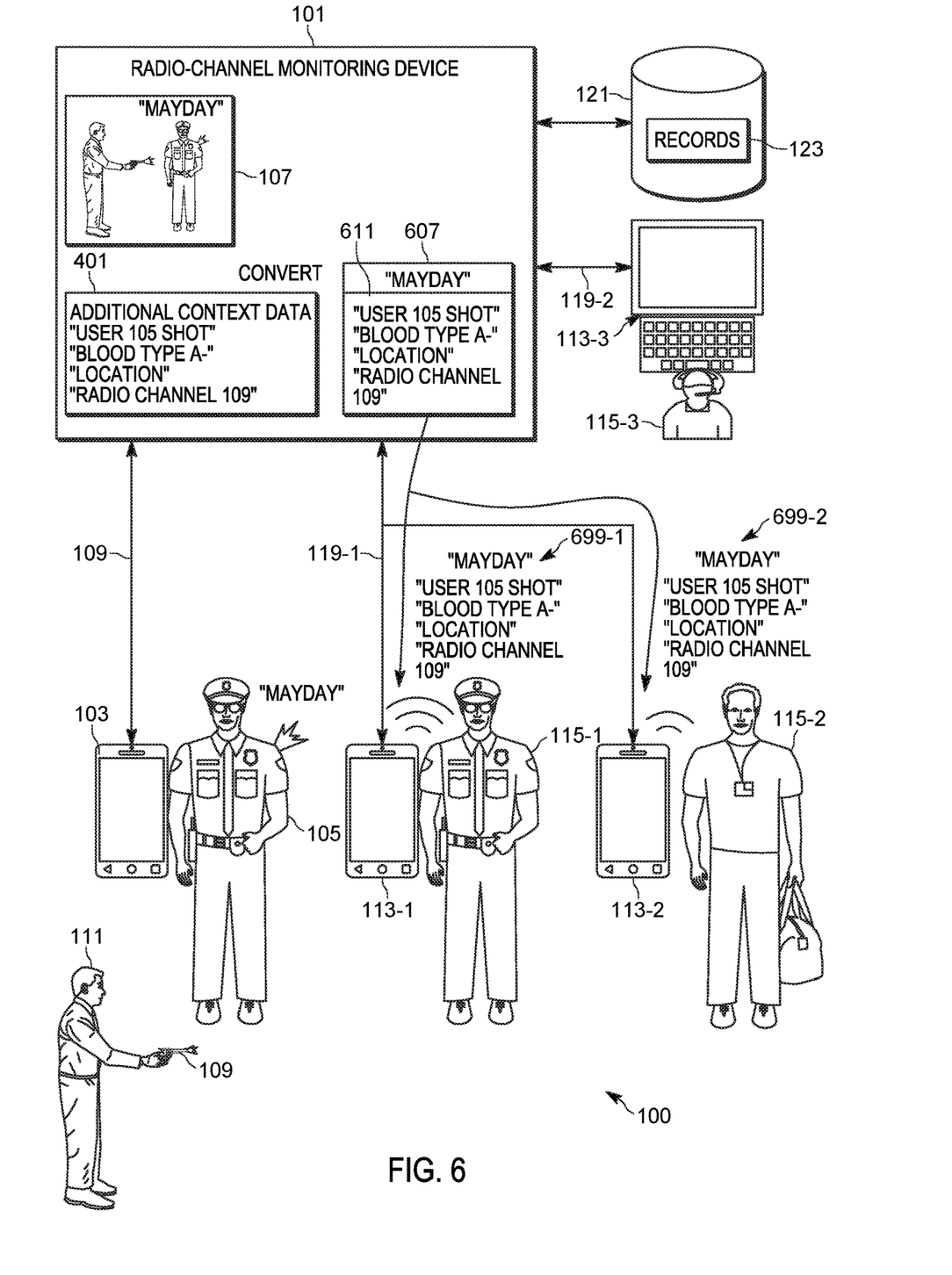
FIG. 6 depicts yet further aspects of the example of the method for rebroadcasting communication data with additional context data implemented in the system of FIG. 1.

Attention is next directed to FIG. 4, FIG. 5 and FIG. 6, which depict an example of the method 300 being implemented in the system 100. FIG. 4, FIG. 5 and FIG. 6 are substantially similar to FIG. 1, with like components having like numbers.

Attention is first directed to FIG. 4, which depicts the device 101 monitoring and/or detecting (e.g., at the block 301 of the method 300) the communication data 107 on the first radio channel 109, by receiving the communication data 107, and comparing (e.g., at the block 303 of the method 300) the communication data 107 with the given criteria 125. As depicted, the device 101 has determined that the communication data 107 meets the given criteria 125 (e.g., a "YES" decision at the block 303, as indicated by the word "MEETS" in FIG. 4). For example, the device 101 may determine that the word "MAYDAY" in the communication data 107 meets given criteria 125 indicating that the word "MAYDAY" in communication data is to result in a rebroadcast of the communication data, as described above.

As also depicted in FIG. 4, the device 101, responsive to determining that the communication data 107 meets the given criteria 125 for rebroadcasting, determines additional context data 401 (e.g., as indicated in FIG. 4 by the arrow between the word "MEETS", and the additional context data 401). In particular, the additional context data 401 includes an identifier of the first user 105 (e.g., as represented by text "USER 105", which may be a name and/or a badge number of the first user 105 as determined from the records 123), an indication of an injury of the first user 105 (e.g., as represented by text "SHOT", as determined from the communication data 107), a blood type of the first user 105 (e.g., as represented by text "BLOOD TYPE A–", as determined from the records 123), a location of the first user 105 (e.g., as represented by text "LOCATION", which may be an address and/or GPS coordinates, as determined from the metadata of the communication data 107, and the like), an identifier of the first radio channel 109 (e.g., as represented by text "RADIO CHANNEL 109", which may be a channel number and/or talkgroup identifier of the first radio channel 109).

Attention is next directed to FIG. 5, which depicts the device 101 identifying (e.g., at the block 307 of the method 300) a second radio channel 119-1 for rebroadcast of the communication data 107. For example the second radio channel 119-1 be identified by the device 101 as the first user 105 is injured and the user 115-2 operating a second radio device 113-2 on the second radio channel 119-1 is a medical technician, and/or the user 115-1 operating a second radio device 113-1 on the second radio channel 119-1 a closest user to the first user 105. The identification of the second radio channel 119-1, indicated via an arrow 501, may be based on content of the communication data 107 and/or the additional context data 401 However, identification of the second radio channel 119-1 may alternatively be based on context data of the second radio devices 113, the second users 115, and the like, as described above.

Attention is next directed to FIG. 6, which depicts the device 101 causing (e.g., at the block 309 of the method 300 converting at least a portion of the communication data 107 to a format compatible with the second radio channel 119-1, which may support audio data but not video data. Hence, as depicted an audio data portion 607 of the communication data 107, for example the audio data "MAYDAY", is extracted from the communication data 107, and the additional context data 401 is converted to audio data 611 and appended to the audio data portion 607 of the communication data 107. Alternatively the depicted audio data portion 607 may be converted to text with the additional context data 401 appended thereto.

As also depicted in FIG. 6, the device 101 broadcasts (e.g., at the block 309), on the identified second radio channel 119-1, the audio data portion 607 of the communication data 107 with the audio data 611 indicative of the additional context data 401 succeeding the audio data portion 607. The audio data portion 607 and the audio data 611 are received at the second radio devices 113-1, 113-2, as broadcast on the identified second radio channel 119-1, and provided as respective sound and/or audio 699-1, 699-2 for example via speakers at the second radio devices 113-1, 113-2.

Alternatively, when the audio data portion 607 is converted to text, with the additional context data 401 (e.g., also text) appended thereto, and broadcast on the identified second radio channel 119-1, the second radio devices 113-1, 113-2 may receive the audio data portion 607, as converted to text, with the additional context data 401 appended thereto, and convert the received text to the respective sound and/or audio 699-1, 699-2. In such examples, it is further understood that the identified second radio channel 119-1 supports transmission of text.

Regardless, the second users 115-1, 115-2 hear the respective sound and/or audio 699-1, 699-2 and may respond to the "MAYDAY" of the first user 105 accordingly. For example, the second users 115-1, 115-2 may hear "MAYDAY" and tune their respective second radio devices 113-1, 113-2 to the channel number and/or talkgroup number indicated by "RADIO CHANNEL 109" of the additional context data 401 (and/or the audio data 611) and/or travel to the "LOCATION" indicated by the additional context data 401 (and/or the audio data 611) and/or hear "USER 105 SHOT" and "BLOOD TYPE A–" and take appropriate medical action.

In some examples, the information received from the device 101 (whether as audio data 607, 611, or as text) may be converted (e.g., by the respective second radio devices 113-1, 113-2) to a format compatible with display screens of the respective second radio devices 113-1, 113-2 and rendered at the display screens of the respective second radio devices 113-1, 113-2.

As should be apparent from this detailed description above, the operations and functions of computing devices described herein are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
    detecting, by a radio-channel monitoring device, communication data broadcast on a first radio channel by a radio device associated with a first user; and
    in response to determining, by the radio-channel monitoring device, that the communication data meets given criteria for rebroadcasting:
        determining, by the radio-channel monitoring device, additional context data associated with one or more of the radio device and the first user;
        identifying, by the radio-channel monitoring device, one or more second radio channels for rebroadcast of the communication data; and
        causing, by the radio-channel monitoring device, at least a portion of the communication data and the additional context data to be broadcast on the one or more second radio channels, the additional context data being broadcast in a channel-compatible format one or more of preceding, succeeding and embedded in the portion of the communication data.

2. The method of claim 1, wherein the communication data comprises one or more of audio data and video data.

3. The method of claim 1, wherein determining, by the radio-channel monitoring device, that the communication data meets the given criteria for rebroadcasting comprises determining that one or more of:
    the communication data comprises one or more given words;
    the communication data comprises one or more given phrases;
    the communication data comprises one or more given sounds;
    the communication data comprises one or more voices different from a voice of the first user;
    the communication data comprises one or more images associated with emergencies; and
    the one or more images comprises respective images of the first user in a physically injured state.

4. The method of claim 1, further comprising converting the additional context data to the channel-compatible format.

5. The method of claim 1, wherein the channel-compatible format comprises an audio format, and the method further comprises converting the additional context data to the audio format using a text-to-speech engine.

6. The method of claim 1, wherein the additional context data associated with one or more of the radio device and the first user comprises one or more of:
   a determined location of the radio device;
   a name of the first user;
   a description of the first user;
   a medical condition of the first user;
   a respective description of a vehicle associated with the first user;
   respective names one or more other users closest to the first user;
   respective descriptions of the one or more other users closest to the first user;
   a time indicating when the communication data was broadcast; and
   a type of incident to which the first user is assigned.

7. The method of claim 1, wherein the additional context data associated with one or more of the radio device and the first user comprises identifiers of one or more of
   the radio device;
   the first user; and
   the first radio channel.

8. The method of claim 1, wherein the additional context data is varied for each of two or more of the second radio channels based on one or more of:
   an associated function of each of the two or more of the second radio channels;
   one or more of associated roles and associated identities of other users associated with each of the two or more of the second radio channels; and
   context data associated with the other users associated with each of the two or more of the second radio channels.

9. The method of claim 1, wherein identifying the one or more second radio channels comprises:
   determining content of the communication data; and
   selecting the one or more second radio channels as a function of one or more of: the content of the communication data; and the additional context data of one or more of the radio device and the first user.

10. The method of claim 1, wherein the first radio channel and the one or more second radio channels comprise one or more of: land mobile radio (LMR) channels; trunked radio channels; and talkgroups.

11. A device comprising:
    a communication unit; and
    a controller communicatively coupled to the communication unit, the controller configured to:
       detect, via the communication unit, communication data broadcast on a first radio channel by a radio device associated with a first user; and
       in response to determining that the communication data meets given criteria for rebroadcasting:
          determine additional context data associated with one or more of the radio device and the first user;
          identify one or more second radio channels for rebroadcast of the communication data; and
          cause, via the communication unit, at least a portion of the communication data and the additional context data to be broadcast on the one or more second radio channels, the additional context data being broadcast in a channel-compatible format one or more of preceding, succeeding and embedded in the portion of the communication data.

12. The device of claim 11, wherein the communication data comprises one or more of audio data and video data.

13. The device of claim 11, wherein the controller is further configured to determine that the communication data meets the given criteria for rebroadcasting by determining that one or more of:
    the communication data comprises one or more given words;
    the communication data comprises one or more given phrases;
    the communication data comprises one or more given sounds;
    the communication data comprises one or more voices different from a voice of the first user;
    the communication data comprises one or more images associated with emergencies; and
    the one or more images comprises respective images of the first user in a physically injured state.

14. The device of claim 11, wherein the controller is further configured to convert the additional context data to the channel-compatible format.

15. The device of claim 11, wherein the channel-compatible format comprises an audio format, and the controller is further configured to convert the additional context data to the audio format using a text-to-speech engine.

16. The device of claim 11, wherein the additional context data associated with one or more of the radio device and the first user comprises one or more of:
    a determined location of the radio device;
    a name of the first user;
    a description of the first user;
    a medical condition of the first user;
    a respective description of a vehicle associated with the first user;
    respective names one or more other users closest to the first user;
    respective descriptions of the one or more other users closest to the first user;
    a time indicating when the communication data was broadcast; and
    a type of incident to which the first user is assigned.

17. The device of claim 11, wherein the additional context data associated with one or more of the radio device and the first user comprises identifiers of one or more of
    the radio device;
    the first user; and
    the first radio channel.

18. The device of claim 11, wherein the controller is further configured to vary the additional context data for each of two or more of the second radio channels based on one or more of:
    an associated function of each of the two or more of the second radio channels;
    one or more of associated roles and associated identities of other users associated with each of the two or more of the second radio channels; and
    context data associated with the other users associated with each of the two or more of the second radio channels.

19. The device of claim 11, wherein the controller is further configured to identify the one or more second radio channels by:
    determining content of the communication data; and
    selecting the one or more second radio channels as a function of one or more of: the content of the communication data; and the additional context data of one or more of the radio device and the first user.

20. The device of claim 11, wherein the first radio channel and the one or more second radio channels comprise one or more of: land mobile radio (LMR) channels; trunked radio channels; and talkgroups.

* * * * *